United States Patent
Wei et al.

(10) Patent No.: US 6,515,967 B1
(45) Date of Patent: Feb. 4, 2003

(54) METHOD AND APPARATUS FOR DETECTING A FAULT IN A MULTICAST ROUTING INFRASTRUCTURE

(75) Inventors: Liming Wei, Fremont, CA (US); Dino Farinacci, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/107,268

(22) Filed: Jun. 30, 1998

(51) Int. Cl.⁷ .................................................. H04L 12/26
(52) U.S. Cl. ........................ 370/244; 370/248; 714/25
(58) Field of Search ................................. 370/242, 243, 370/244, 245, 248, 250, 252, 390; 714/25, 48

(56) References Cited

U.S. PATENT DOCUMENTS

| | | | | |
|---|---|---|---|---|
| 5,121,382 A | * | 6/1992 | Yang et al. | 370/250 |
| 5,500,851 A | * | 3/1996 | Kozaki et al. | 370/250 |
| 5,850,388 A | * | 12/1998 | Anderson et al. | 370/252 |
| 6,032,194 A | * | 2/2000 | Gai et al. | 709/239 |
| 6,192,036 B1 | * | 2/2001 | Buhler et al. | 370/252 |

* cited by examiner

Primary Examiner—Chau Nguyen
Assistant Examiner—D. Trinh
(74) Attorney, Agent, or Firm—Beyer Weaver & Thomas (57) ABSTRACT

A method and system for detecting faults in data packet routing devices in a computer network capable of routing messages using a multicast protocol is described. Faults in devices, such as routers and switches, are detected in near real-time when using a multicast routing infrastructure by configuring a device to be a sender or source of test data packets and one or more other devices to receive test data packets. The test packet sender transmits test data packets to a test group of test packet receivers where the test group has a group identifier. The test receivers prepare data or fault reports describing errors regarding missing or duplicated data packets. These fault reports are prepared soon after the errors are detected and sent back to a multicast routing manager for isolating the device causing the fault. The messages sent to the test devices contain instructions regarding time intervals during which fault reports can be sent to the multicast routing manager from the multiple test receivers.

18 Claims, 11 Drawing Sheets

METHOD AND APPARATUS FOR DETECTING A FAULT IN A MULTICAST ROUTING INFRASTRUCTURE

BACKGROUND OF THE INVENTION

1. Field of the Invention

The present invention relates generally to computer software and network applications. Specifically, the present invention relates to computer network testing software for detecting faults in network devices.

2. Discussion of Related Art

In a computer network messages are typically sent from a source to a receiver using a unicast message routing protocol. Unicast message delivery involves sending a message from a source having a distinct IP (Internet Protocol) address to a single receiver also having a distinct IP address. Unicast routing protocols are also used for when a source is sending a message to multiple receivers. In this situation, multiple unicast messages are sent from the source to each individual receiver where each receiver has an IP address.

Recently, message routing protocols referred to as multicast routing are being used to route messages in computer networks. In unicast routing a source sends a message only to a receiver. With multicast routing a source sends a single message to a group that includes individual receivers. The source sends the message to a group IP address which corresponds to all the IP addresses of the individual group members. For example, group A can include five clients in a computer network and a sender can send a message to each of the five members by sending one message to the group IP address (a client can belong to a group by subscribing to the group IP address). The message is then propagated to each individual client. Multicast routing protocols are described in more detail in "Multicast Routing in a Datagram Internetwork" by Stephen Deering, PhD Thesis, Stanford University, 1991 and "The PIM Architecture for Wide-Area Multicast Routing" by Stephen Deering, et. al. IEEE/ACM, Transaction on Networking, April 1996, Vol. 4, No. 2. which are incorporated herein by reference. Multicast routing protocols have recently emerged from their developmental stage and are now increasingly prevalent in computer networks as a technique for routing messages. However, management tools specifically tailored for such protocols are just recently being developed and are essential for the continued growth of multicast routing methods.

A problem with large multicast routing infrastructures is the near real-time detection and isolation of problems with network components, or more specifically, the detection of faults in devices such as routers and switches. Existing tools for managing, in a systematic way, multicast routing infrastructures are inefficient and inconvenient, particularly across large routing systems (individual networks or domains can be connected to form a large multicast infrastructure). The most common tool for isolating faults in a multicast infrastructure is MTRACE, used to isolate faults or problems with network devices. Presently, no tools exist for automated multicast fault detection. MTRACE is a non-proprietary software program and technique for isolating (although not detecting) a fault. Its use is described in more detail with reference to FIG. 1.

Figure 1:
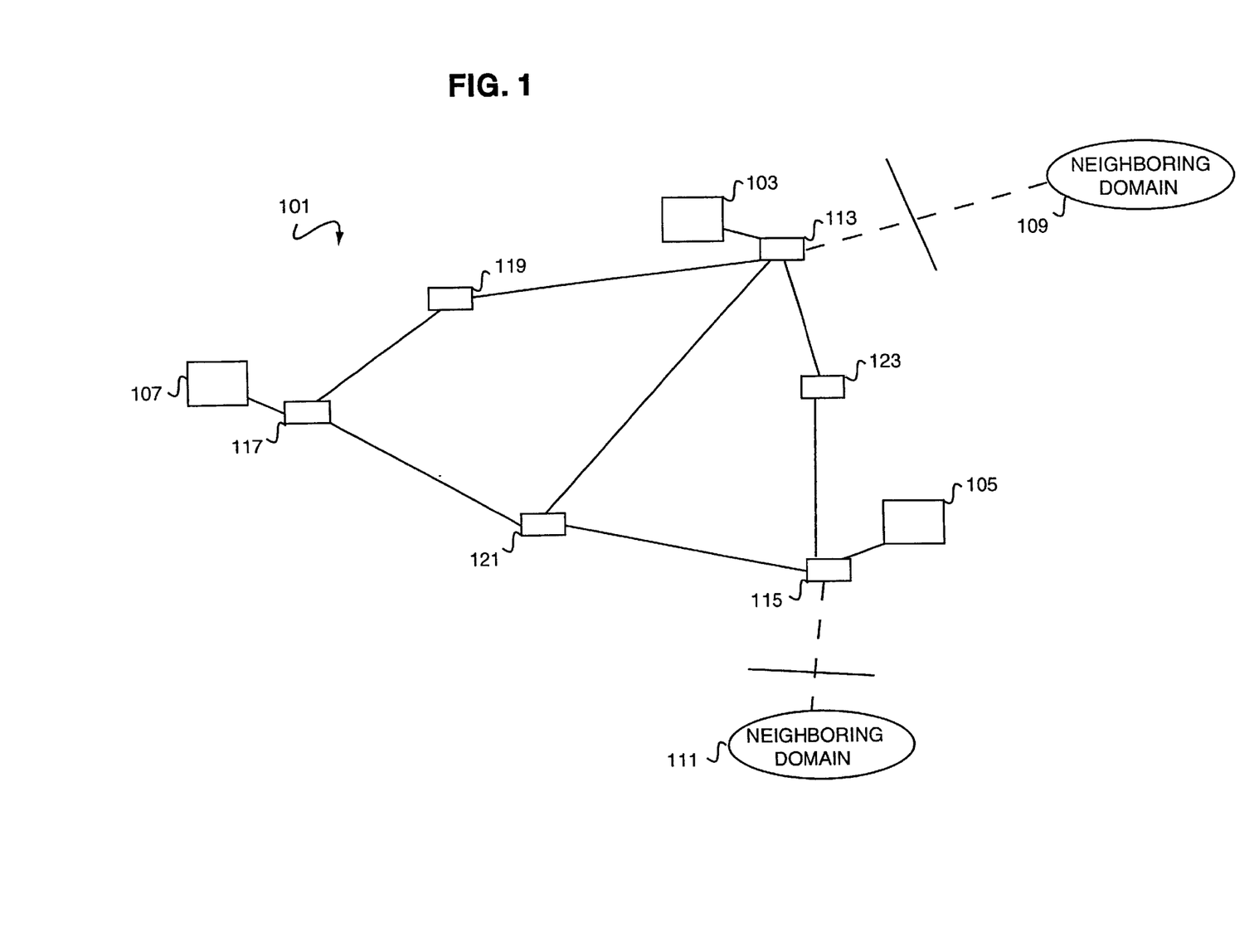
FIG. 1 is an illustration showing typical components in a computer network configuration.

FIG. 1 is an illustration showing typical components in a computer network configuration. It includes client terminals connected to edge routers which, in turn, are connected to transit routers for receiving and forwarding data packets. A router is one example of a packet manipulation device. It can also collect statistics on data packets that it receives and forwards. FIG. 1 shows three client terminals 103, 105, and 107 within a single domain 101. Also shown are two neighboring domains 109 and 111 which can be linked to domain 101 to form a large multicast configuration, in which domains 101, 109 and 111 are part of the network topology. Terminal 103 is connected to an edge router 113. Similarly, terminal 105 is connected to edge router 115 and terminal 107 is connected to edge router 117. Located between the edge routers are transit routers 119, 121, and 123. Transit routers are used to receive and forward data packets between edge routers in a typical network configuration.

MTRACE is used to isolate faults that occur in devices such as edge routers and transit routers, in multicast infrastructures. Typically, a network operator receives a call from a user indicating that a problem has occurred, such as receiving an incomplete message. The network operator must first determine who is the source of the message and the group to which the user belongs. MTRACE does not provide real-time alerting capability in a multicast infrastructure. In addition, a network operator using MTRACE to isolate a problem must be familiar with the multicast protocol. Some of the typical problems that can occur when a device is not functioning properly are 1) a data packet is not received at all by a device or an intended receiver of a message, 2) there is a implementation bug in the software, 3) there is congestion in the network e.g., packets are sent faster than they can be received, 4) there is a misconfiguration of the network topology, or 5) there is unnecessary duplication of data packets occurring in the devices.

After the path has been traced, the network operator examines the MTRACE data, which itself is rather cryptic, to determine which device is causing the fault. MTRACE is used to determine the path of a data packet from the source to the receiver. Using MTRACE to locate a problem requires a significant amount of time. For example, if edge router 113 did not receive a data packet, MTRACE is used to check all the routers between router 113 and the source (e.g., router 117). The device is not isolated until the entire path between the receiver and the source is evaluated. Each device maintains statistics which are read by MTRACE. The statistics include packet counts and a state of the device. Once the source router 117 is reached, the MTRACE output is examined and the problematic device is pinpointed. However, it does not perform real-time detection of faults.

Therefore, it would be desirable to have a multicast routing management tool that allows for near real-time fault detection, i.e. a fault alarm without relying on customer phone calls, that can also provide a more systematic way to get up-to-date multicast routing status reports. In addition, it would be desirable for network operators to have a method of testing in advance, a multicast routing configuration to insure that there are no problems with devices in, for example, the paths necessary to reach a critical group of receivers.

SUMMARY OF THE INVENTION

To achieve the foregoing, and in accordance with the purpose of the present invention, methods, systems, and computer-readable media for detecting faults in data packet routing devices in a computer network capable of routing messages using a multicast protocol are described. In a preferred embodiment of one aspect of the invention, a method of detecting faults in a multicast routing infrastructure in near real-time includes configuring a device to be a sender or source of test data packets and one or more other devices to receive test data packets. The test packet sender transmits test data packets to a test group of test packet receivers where the test group has a group identifier. The test receivers prepare data or fault reports describing errors regarding missing or duplicated data packets. These fault reports are prepared soon after the errors are detected.

In another preferred embodiment, a device in the network is configured to be a multicast routing monitor that initiates desired multicast routing tests. Fault reports are sent from the test receivers to the multicast routing monitor in a time-dependent manner to prevent overloading the network and the routing monitor with fault report traffic. In yet another preferred embodiment, the test sender is configured by sending it a source configuration request and a test receiver is configured by sending it a receiver configuration request. A receiver configuration request includes a test group identifier indicating that the test packet receiver belongs to a particular test group.

In a preferred embodiment of another aspect of the invention, a system for detecting faults in near real-time in a multicast routing infrastructure includes a test monitoring device, one or more test source devices, and multiple test receiving devices. The test monitoring device transmits test configuration data packets to potential test senders and test receivers, and collects fault information from test receivers. The test senders are configured to transmit test data packets to multiple test receivers. The test receivers are configured to receive test packets from the test senders and transmit fault data to the test monitoring device.

In a preferred embodiment, the system includes test source request packets and test receiver request packets created and transmitted by the test monitoring device and containing an identifier corresponding to the test monitoring device. In yet another preferred embodiment, the test receiver request packets and the test source request packets contain a test group identifier for identifying a group of test packet receiving devices. In yet another preferred embodiment, a test receiver request packet contains data relating to time intervals in which the test packet receiving device transmits fault data to the test monitoring device. In yet another preferred embodiment, a test receiver request packet contains criteria on when a fault in the multicast routing infrastructure has occurred.

In another aspect of the invention, a format of a test sender request message for configuring a network device to transmit test data packets using a multicast routing protocol is described. In a preferred embodiment, a test sender request message includes an originator identifier field, a target identifier field, and a test group identifier field. The originator identifier field contains an identifier, such as an Internet Protocol address, corresponding to a multicast routing manager device. The target identifier field contains an identifier corresponding to a test sender device. The test group identifier field contains an identifier corresponding to a group of test receivers that includes one or more test receivers. In another preferred embodiment, the test sender request message includes a packet delay field used in the emission of data packets from the sender data packet routing device.

In another aspect of the invention, a format of a test receiver request message for configuring a network device to receive test data packets using a multicast routing protocol is described. In a preferred embodiment, a test receiver request message includes an originator identifier field, a test group identifier field, and a test sender identifier field. The originator identifier field contains an identifier, such as an Internet Protocol address, corresponding to a multicast routing manager device. The test group identifier field contains an identifier corresponding to a group of test receivers. The test sender identifier field contains an identifier corresponding to a test sender that will be sending the test receiver test data packets. In another preferred embodiment, the format of a test receiver request message includes one or more fault data transmission fields containing data relating to when fault data should be transmitted to the multicast routing manager device.

BRIEF DESCRIPTION OF THE DRAWINGS

The invention, together with further advantages thereof, may best be understood by reference of he following description taken in conjunction with the accompanying drawings in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method of facilitating automated fault detection in a large multicast routing infrastructure is described in the various drawings. Network operators require tools that allow them to monitor large multicast infrastructures on a continual basis (e.g., "24/7"). One important feature of monitoring a large network is being able to detect faults in devices as close to real-time as possible. Thus, immediate or near real-time notification of faults is an important priority among network administrators. In addition, network administrators need the ability of testing portions of the network to ensure that group paths are operational.

In a preferred embodiment, the component used for monitoring multicast routing is a multicast routing monitor (MRM) manager. The MRM system is used to describe a generic method and protocol for fault detection and alarm in a multicast network. In other preferred embodiments, alternative terms can be used to describe the detection procedure and protocol. The two primary components of an MRM system are the MRM testers and the MRM manager, manifested in an MRM terminal or client machine in a preferred embodiment. The MRM manager can be implemented, in its simplest form, as a command line script or wrapper containing requests with a simple display function. In a preferred embodiment, it is a more sophisticated component and incorporated as part of an operational network monitoring tool used daily of a network operation center by a network manager. The present invention describes a protocol and messaging format used between the MRM manager and the MRM testers. This includes a way to monitor large multicast infrastructures creating minimal load thereby reducing network traffic. There is a built-in mechanism in the protocol that regulates traffic and thereby prevents the actual monitoring of the network from overloading the same network.

Figure 2:
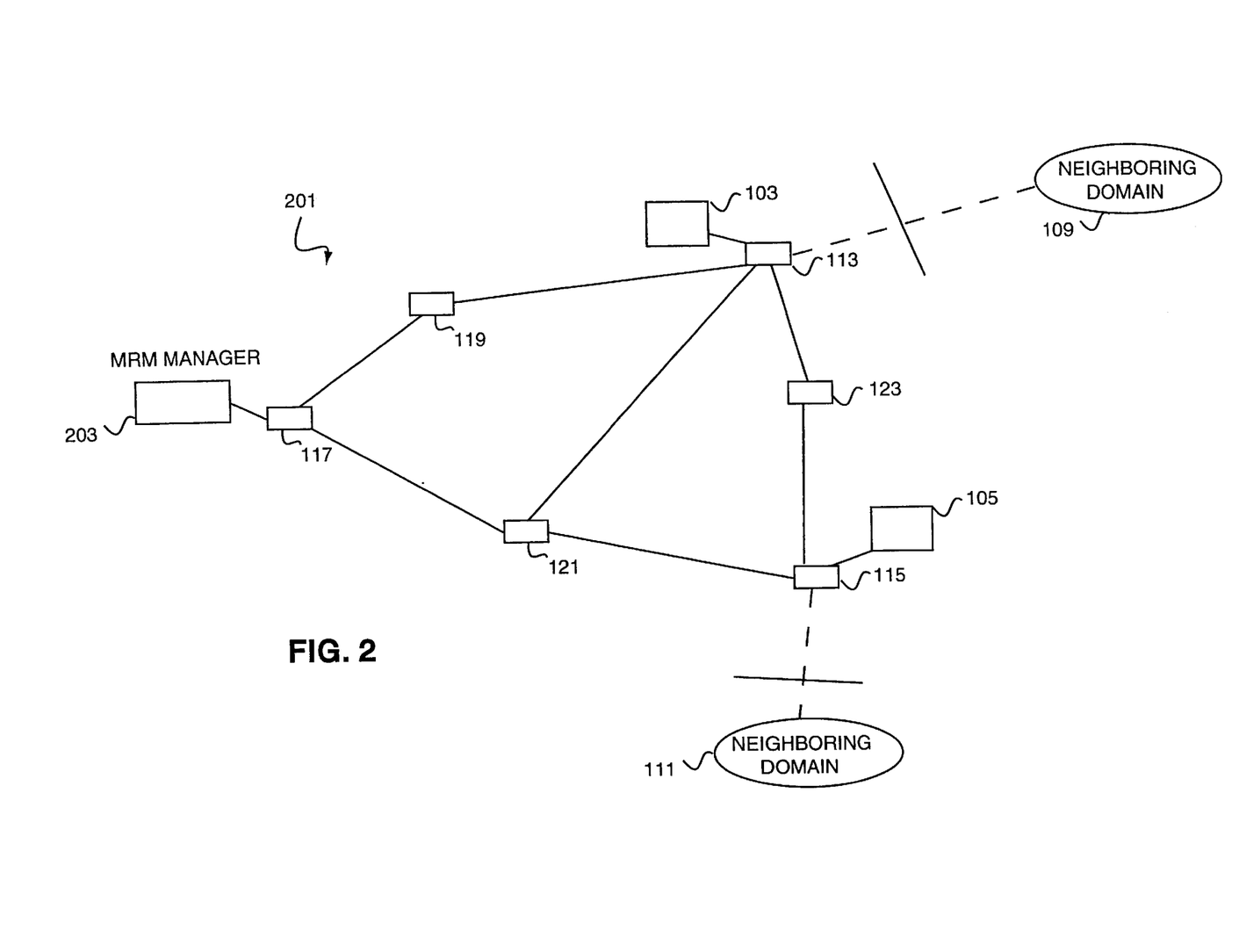
FIG. 2 is an illustration showing components in a network configuration including an MRM manager client terminal in accordance with a preferred embodiment of the present invention.

FIG. 2 is an illustration showing components of a typical network configuration including an MRM manager client in accordance with a preferred embodiment of the present invention. The potential MRM testers can be, for example, routers 113, 115, 119, 121 or 123, shown in FIG. 2. Each tester is configured by a network operator or manager through an MRM manager client terminal 203. Among the MRM testers, at least one is designated as a test sender (TS) and is given the IP address of a multicast group which will receive test data packets. The source does not need to know the exact IP addresses of all members in the group. In a preferred embodiment, there are well-known or "canned" groups that can be given names and are known by MRM manager 203. The MRM testers provide more than a simple raw packet count. A fault report from an MRM test receiver to MRM manager 203 can tell the manager whether the faulty device is transmitting duplicate packets or deleting packets. A test receiver can also tell the MRM manager what type of fault is occurring, thereby providing more granularity in the testing.

MRM manager 203 configures tests and collects fault data, in the form of fault reports, from test receivers, for a network operator. An MRM tester either transmits or receives test data packets. The MRM testers can be any routing device or end host, and provide statistics regarding received data packets which can be used to derive network routing status. In a preferred embodiment, the data packets can be provided or sourced by a router acting as a MRM tester in response to a request (discussed below) from MRM manager 203. In other preferred embodiments, they can be existing multicast network traffic originating from a live application. In a preferred embodiment, a device that originates MRM test data packets is referred to as a test source or sender (TS). A configured set of MRM testers receiving the test data traffic and collecting receiver statistics are referred to as test receivers (TRs).

In a preferred embodiment, the test data packets are encapsulated using Real-Time Transmission Protocol (RTP, version 2), a standard protocol well known in the art. The benefit of using the RTP2 encapsulation is to allow reuse of existing RTP-based reception mechanisms. Although the RTP2 packet format is used, it should be noted that the design goals and rules for the MRM message exchange protocol are entirely separate and distinct from those specified in RTP.

Figure 3:
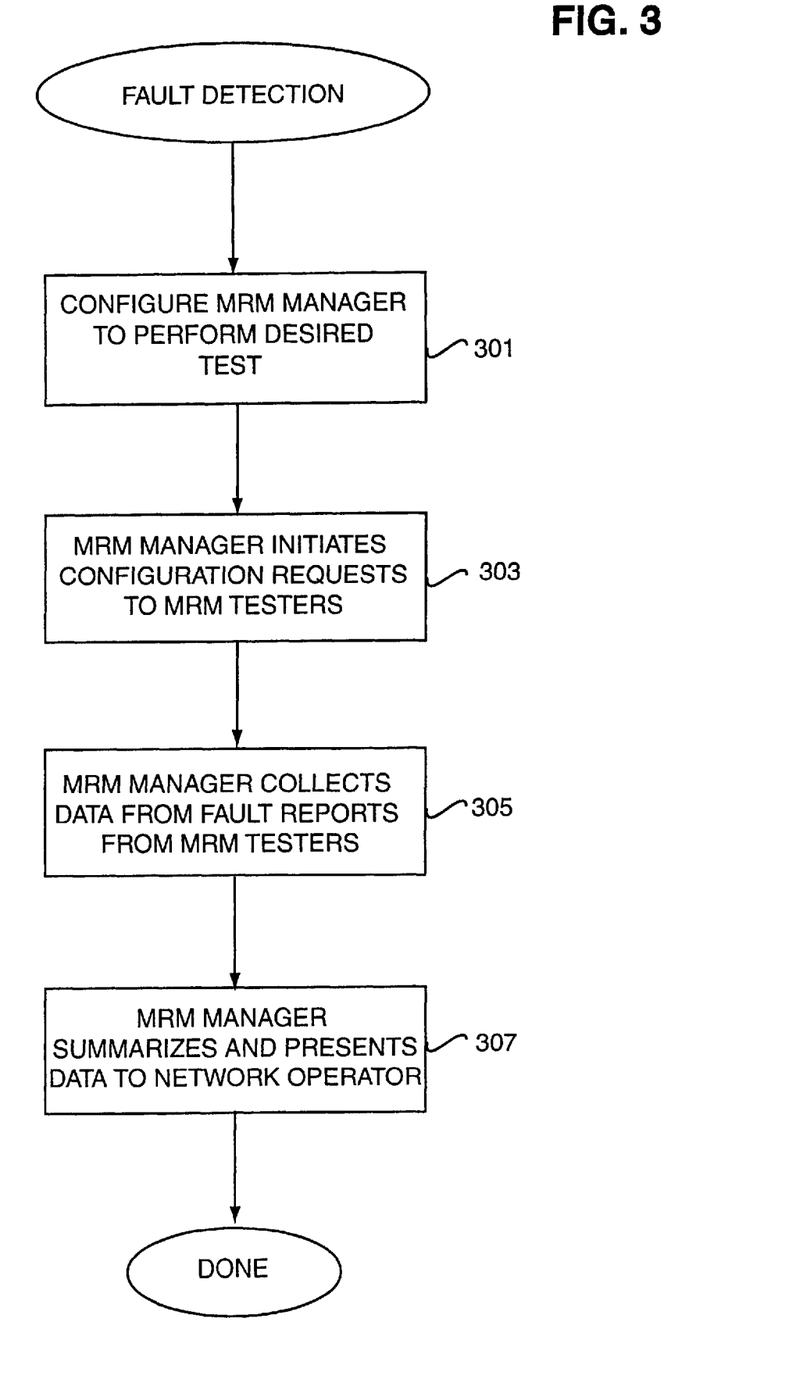
FIG. 3 is a flow diagram showing a process of detecting a fault in a multicast routing infrastructure in accordance with a preferred embodiment of the present invention.

FIG. 3 is a flow diagram showing a process of detecting a fault in a multicast routing infrastructure in accordance with one embodiment of the present invention. During fault detection and notification, the MRM system does not require significant detail about the nature or character of the fault. The basic premise is to source or transmit data packets from designated locations (test senders) in the network and monitoring reception conditions at other locations (TRs) in the network. At a step 301, the MRM manager is configured to perform a desired test. For example, a test to detect packet loss exceeding 20% over a 10 minute period. This is typically done by a network manager at an MRM terminal 203 as shown in FIG. 2. At a step 303, the MRM manager initiates configuration requests by sending the requests to the MRM test devices. This step is shown in greater detail in FIG. 4. The MRM manager sends out configuration requests to potential test sources and test receivers. As described above, these test devices are normally transit routers or edge routers connected to client terminals. In a preferred embodiment, the MRM manager maintains a list of potential test device addresses. At a step 305, the MRM manager collects data from fault reports sent by the MRM test receivers. The routing or testing devices are administratively configured as candidate MRM testers. These testers will become active test sources and test receivers once they accept and process requests from an MRM manager. A fault report can indicate, for example, a 22% packet loss has occured. At a step 307, the MRM manager processes and summarizes the data from the faults reports which is then analyzed by a network operation center.

Figure 4:
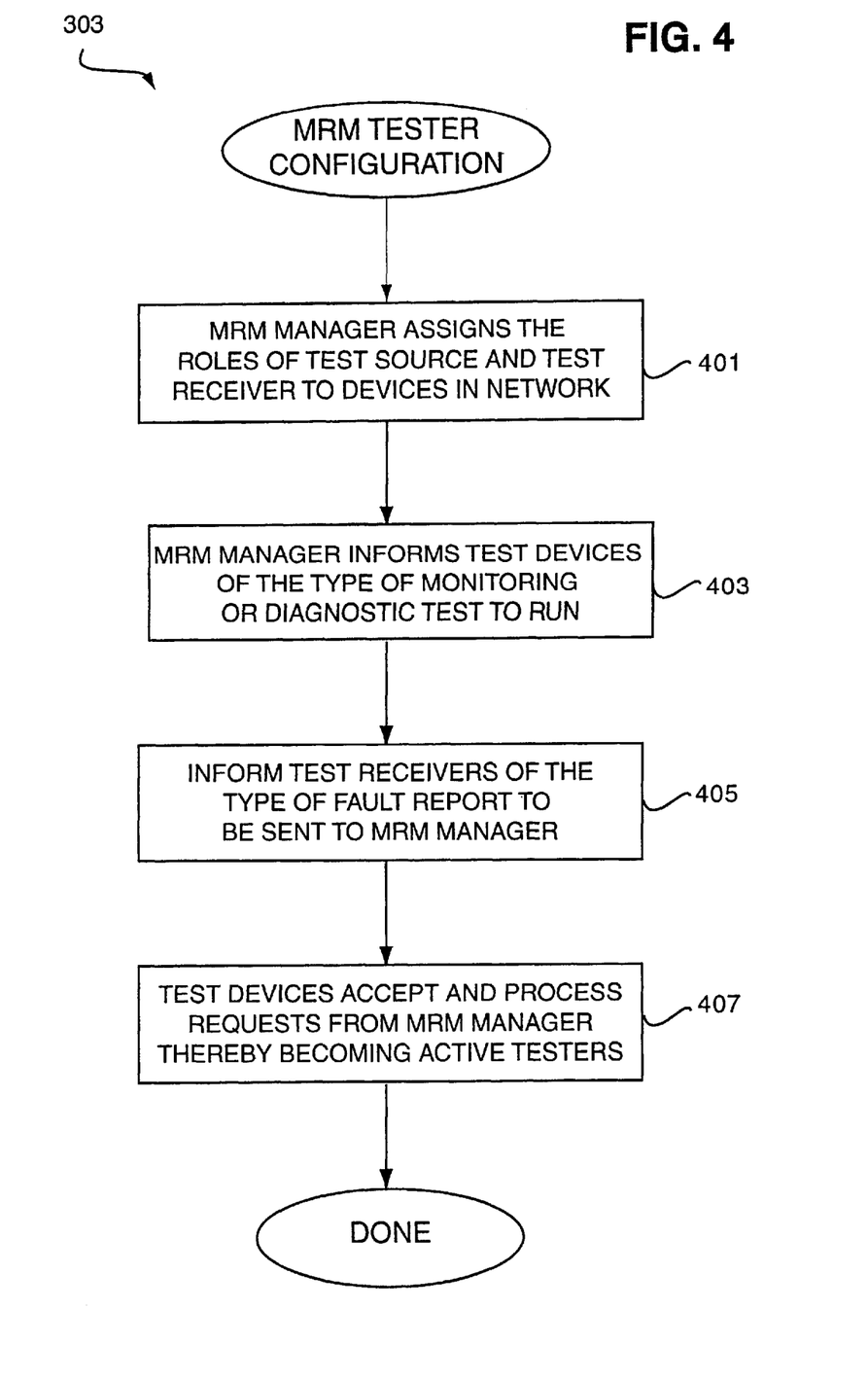
FIG. 4 is a flow diagram showing in greater detail a process for configuring an MRM tester as shown in step 303 of FIG. 3 in accordance with a preferred embodiment of the present invention.

FIG. 4 is a flow diagram showing in greater detail a process for configuring an MRM tester as shown in step 303 of FIG. 3, in a preferred embodiment. At step 401, the MRM manager assigns the roles of test source and test receiver to particular devices in the network. The MRM manager sends test sender requests to test senders and test receiver requests to test receivers. These messages contain a monotonically increasing sequence number to uniquely identify each request originated from an MRM manager (the format of the requests, and the sequence number, are discussed in greater detail with reference to FIGS. 5–9). For example, referring to FIG. 2, MRM manager 203 can assign the role of test receiver to router 113 and router 115 and test source to router 117. At a step 403, the MRM manager informs the assigned test devices of the type of monitoring or diagnostic tests that will run or be executed. At a step 405, the test receivers are informed of the type of fault report to be sent to the MRM manager. The fault report contains data such as statistics and packet counts used by the MRM manager to determine whether there is a fault and what type of fault has occurred. At a step 407, the test devices become active testers by accepting and processing requests described above from the MRM manager.

Figure 5:
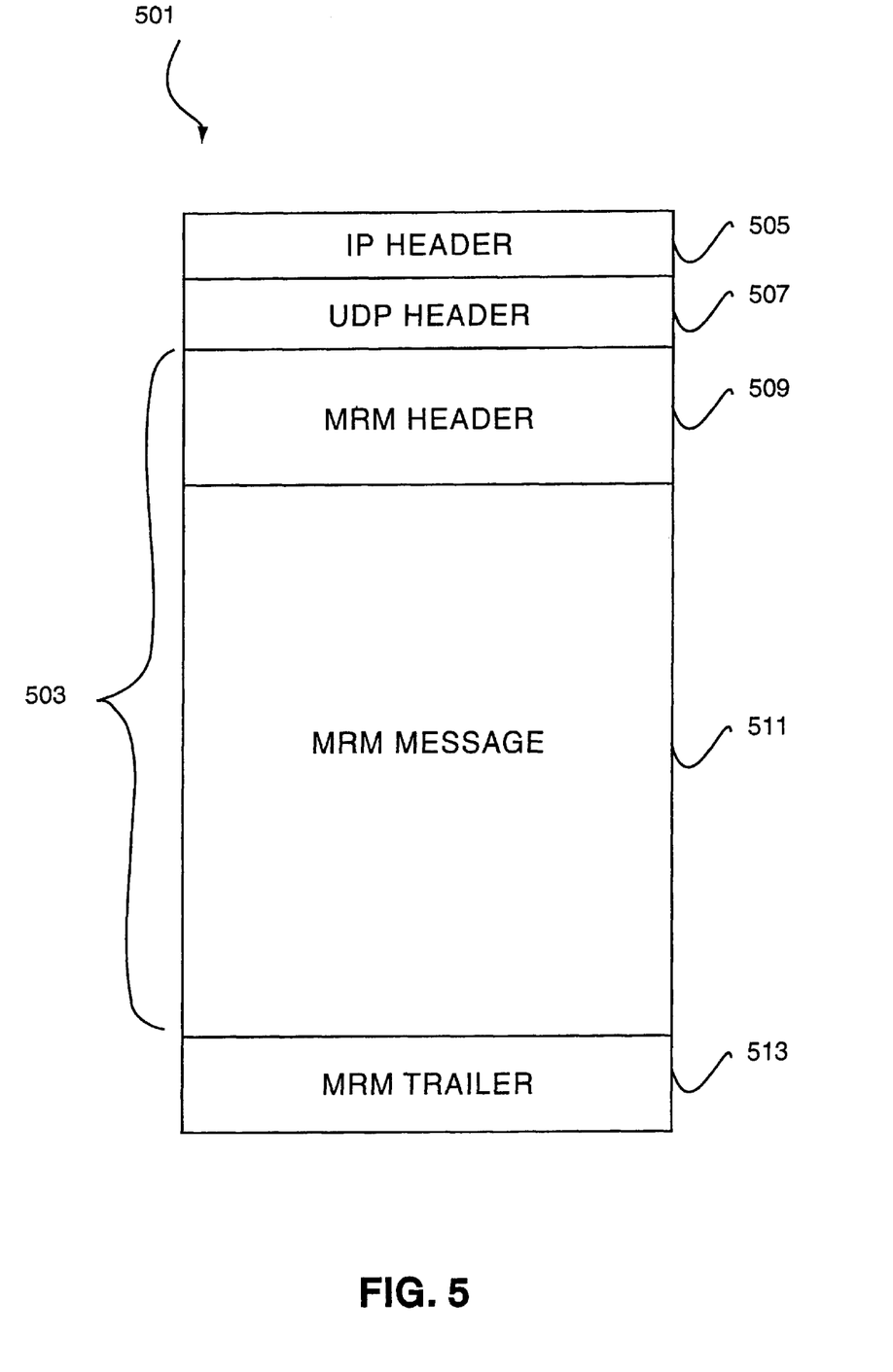
FIG. 5 is a block diagram showing all components of a message in accordance with one embodiment of the present invention.

FIG. 5 is a block diagram showing all components of a message 501 in accordance with one embodiment of the present invention. Before the actual MRM component 503 of the message, the message is encapsulated with an Internet Protocol header 505 necessary for transmission of the message over the Internet. In other preferred embodiment, if the fault detection procedure and system of the present invention is not being used for message routing over the Internet, IP header 505 may not be necessary. The contents and use of header 505 are well known in the field of computer networks. Following IP header 505 is a UDP (User Datagram Protocol) header 507 to further enable transmission of the message to designated addresses. UDP is generally an unreliable protocol for sending messages, thus the need for IP header 505 if messages are sent over the Internet, but can contain useful information not held in IP header 505.

MRM component 503 contains an MRM header 509 followed by an MRM message area 511 and trailer 513. In the described embodiment, the MRM header 509 follows the format of RTP Version 2 (Real-Time Transmission Protocol). In other preferred embodiments, MRM header 509 can follow other protocols or a standard MRM protocol. An MRM header of the described embodiment is shown in greater detail in FIG. 6. MRM message area 511 contains the data intended to be conveyed to one or more recipients. Examples of MRM messages in the described embodiment are a beacon message, shown in FIG. 7, a test sender request message, shown in FIG. 8, a test receiver request message, shown in FIG. 9, or a test packet, shown in FIG. 10. In the described embodiment, MRM trailer 513 does not contain extensive data. An MRM header of the described embodiment is also shown in greater detail in FIG. 6.

Figure 6:
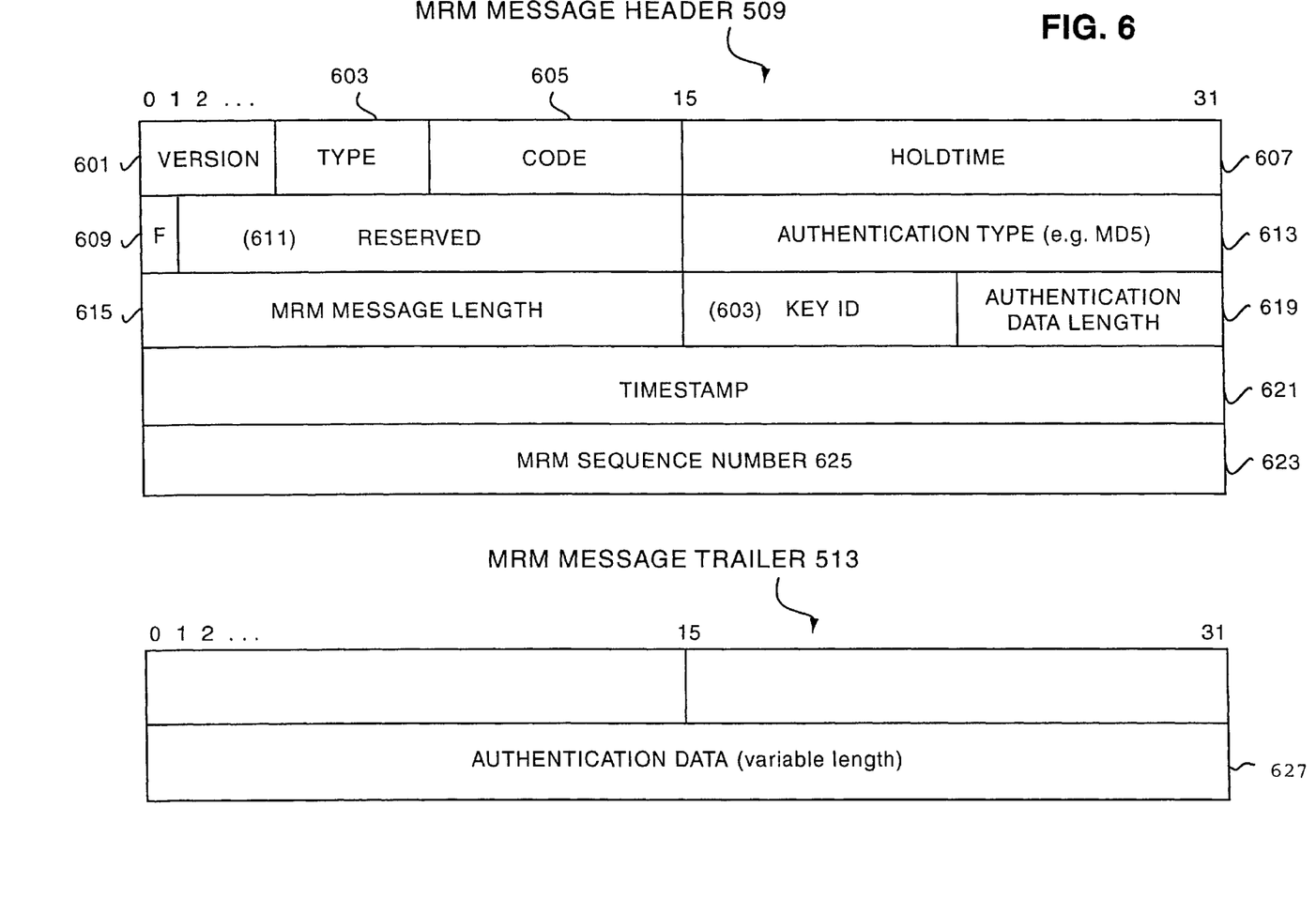
FIG. 6 is a block diagram of formats for an MRM message header and an MRM message trailer in accordance with one embodiment of the present invention.

FIG. 6 is a block diagram of formats for an MRM message header 509 and an MRM message trailer 513 in accordance with one embodiment of the present invention. MRM message header 509 has five words, each word being a 32-bit line having a mid-point at bit 15, as shown immediately above message header 509 in FIG. 6. A four-bit field 601 holds a version number of the MRM being used to detect faults in the multicast routing infrastructure. Another four-bit field 603 holds data indicating an MRM message type. In the described embodiment, there are six message types: beacon message, test sender request, test receiver request, status response, request acknowledgment, and status response acknowledgment. Other preferred embodiments can have more or fewer message types depending on the network user or operator needs. An eight-bit field 605 holds a code that is determined according to the message type and type of operation. A 16 bit field 607 contains a hold time measured in seconds in the described embodiment. This is the maximum length of time the MRM system should follow or honor the enclosed message (e.g. 10 hours). After the hold time, the message is stale and should be ignored.

A one-bit field 609 is used as a continuation field. It holds a 0 if the message has the only or last MRM request message packet and a 1 if there are more MRM request packets following the present packet. A 15-bit field 611 is a reserved field in the described embodiment and can be used as needs of the network user or operator change. Following is a 16-bit field 613 for holding authentication data (e.g. data related to digital signatures). The MRM system of the described embodiment used a Keyed MD5 algorithm for digital signatures. In other preferred embodiments, alternative authentication techniques can be used, and information relating to those techniques can be stored in field 613. A 16-bit field 615 in the third word of message header 509 holds the length of an MRM message stored in message area 511 of FIG. 5. A 4-bit field 617 is related to authentication data held in field 613. In the described embodiment, field 617 holds an index of the MD5 key being used in the MRM system. Similarly, a 4-bit field 619 is used in the described embodiment to hold a length, in bytes, of a message digest in MD5 (16 bytes).

The fourth word in message header 509 is an entire 32-bit field 621 that holds a time stamp, measured in milliseconds in the described embodiment. A time stamp has various uses, such as determining when the message is no longer valid. Another 32-bit field 623 holds an MRM sequence number 625. This number is used to identify the MRM message. One use of MRM sequence number 625 in the described embodiment is to mark certain messages, such as a test sender request from the MRM manager to a potential test sender. All test packets emitted from the test sender to test receivers contain the sequence number 625 of the test sender request that caused the test packets to be sent. This is described in greater detail with respect to FIG. 10. Potential test receivers also receive a copy (similar to a "cc") of a test sender request. Thus, the test receivers are also aware of the sequence number (of the test sender request) and can use this to determine what type of packet faults might be occurring. For example, test packets received by a test receiver from a test sender (in response to a particular test sender request) will have the same sequence number ("root sequence number," as described with respect to FIG. 10). The "root sequence number" in a test packet is used to identify which "test sender request" is responsible for a sequence of test packets. For example, a test sender request 1 (having a sequence number 5) requests that a test sender send test packets to a group G1. A test sender request 2 (having a sequence number 10) requests the test sender to send test packets to group G2. All test packets sent to G1 from the test sender will have root sequence number of 5, and those to G2 will have a root sequence number of 10. The test receiver can use this number to determine which test sender request is responsible for generating these test packets.

FIG. 6 also shows a block diagram of MRM trailer 513 in accordance with one embodiment of the present invention. A field 627 is a variable length field (holding up to 16 bits for MD5) related to header fields 613 and 619. It holds data related to the authentication algorithm used in the MRM system, such as keyed MD5 for digital signatures. In the described embodiment, fields 629 contain constant values (e.g., 0xFFFF and 0x1111). They are used as markers to assist the reading of the packet content in hexidecimal format. They are useful to network managers who often have packet sniffers that only display hexidecimal numbers.

Figure 7:
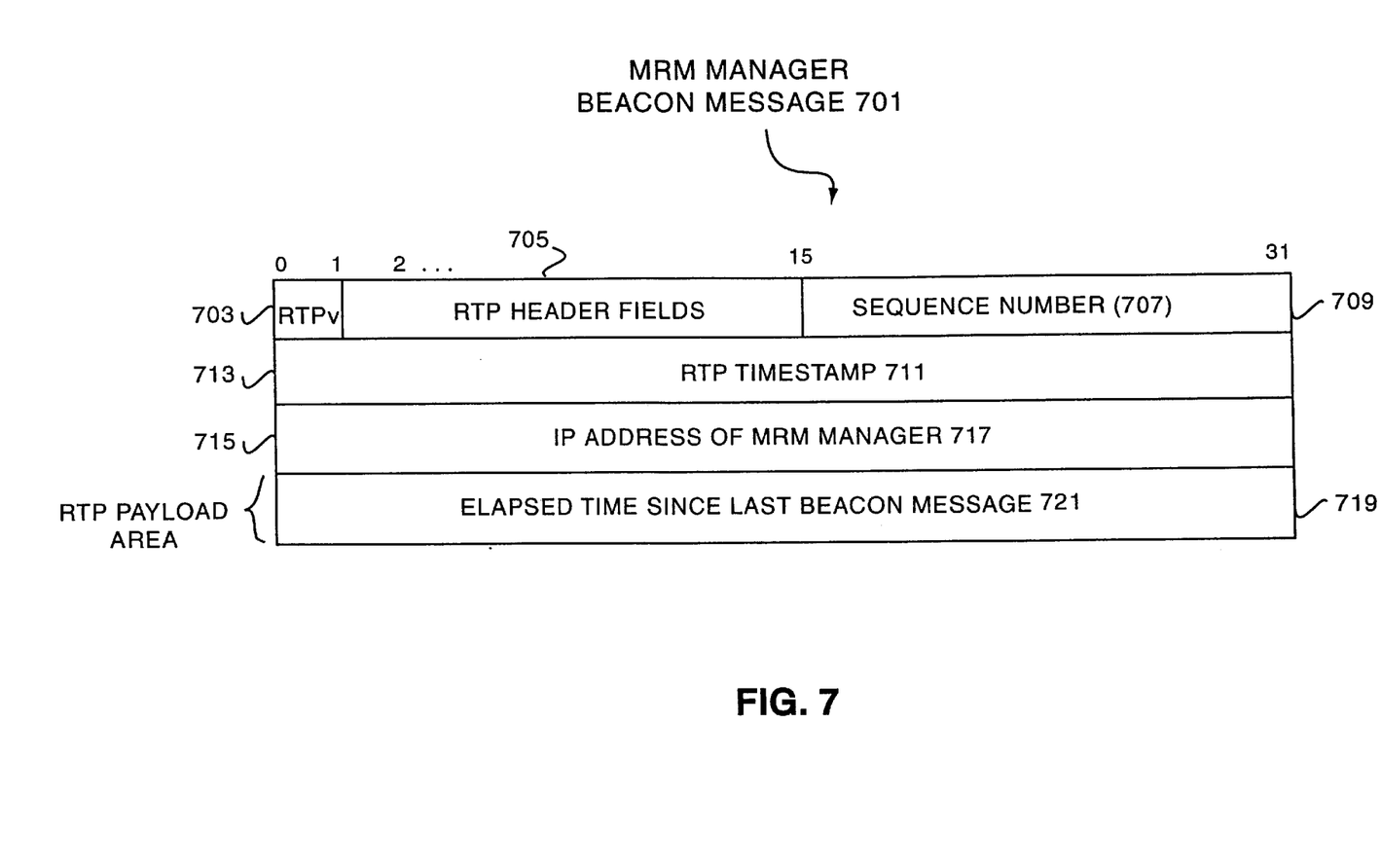
FIG. 7 is a block diagram showing a format of an MRM beacon message in accordance with a preferred embodiment of the present invention.

FIG. 7 is a block diagram showing a format of an MRM beacon message in accordance with a preferred embodiment of the present invention. The MRM manager periodically transmits beacon messages to all MRM testers under its control to inform testers that the manager is still active. In a preferred embodiment, this message is RTP 2 encapsulated. A beacon message 701 can be sent at an appropriate time interval (e.g., one minute) depending on the needs of the system. The total length of each word or line in the beacon message is 32-bits in a preferred embodiment. The beacon message contains four 32-bit words. In a preferred embodiment, the RTP version number is contained in a field 703. Immediately following field 703 is a cell 705 containing standard RTP header fields. These are standard header fields for RTP encapsulation and are well known in the art. The meanings of such RTP header fields can be found in RFC 1889 incorporated herein by reference. In a preferred embodiment, the default settings for these header fields are null. Fields 703 to 715 are all RTP header fields. In a preferred embodiment, sequence number 707 is a monotonically increasing 16-bit unsigned integer. The first beacon message sent from the MRM manager in a test for a particular group has a randomly generated sequence number.

The second word in beacon message 701 is a time stamp 711 contained in a 32-bit field 713. The time stamp is a "wall clock" indicating the time the beacon message was transmitted from the MRM manager and is measured in milliseconds. A field 715 of beacon message 701 is also a 32-bit field and contains an IP address 717 of the MRM manager sending the beacon message. In a preferred embodiment, it is referred to as the synchronization source identifier. In other preferred embodiments, the MRM manager periodically transmits beacon messages to a well-known MRM multicast address (to be assigned by the IANA) to which all test senders and test receivers are listening.

In a preferred embodiment, the minimum contents of a beacon message are a sequence number, authentication data, a time stamp, and the elapsed time since the last beacon message. The elapsed time is shown in a field 719, which holds an elapsed time 721 since the last beacon message was sent by the MRM manager. Sequence number 707 and elapsed time 721 in a beacon message can be used to calculate reception quality by the MRM manager. Field 719 is inside the payload area for the RTP encapsulated message. Elapsed time 721 is measured in milliseconds and indicates the number of milliseconds since the last beacon message was sent by the MRM manager. Generally, the beacon message mechanism has two purposes: it allows test senders and test receivers to assure the active state of the MRM manager, (i.e., it acts as a heartbeat from the MRM manager to devices in the network) and, it allows test devices to recover lost MRM messages, configurations, or state data (that may occur, for example, during reboots). In a preferred embodiment, the MRM manager can choose to send or piggyback manager requests on the beacon messages.

Figure 8:
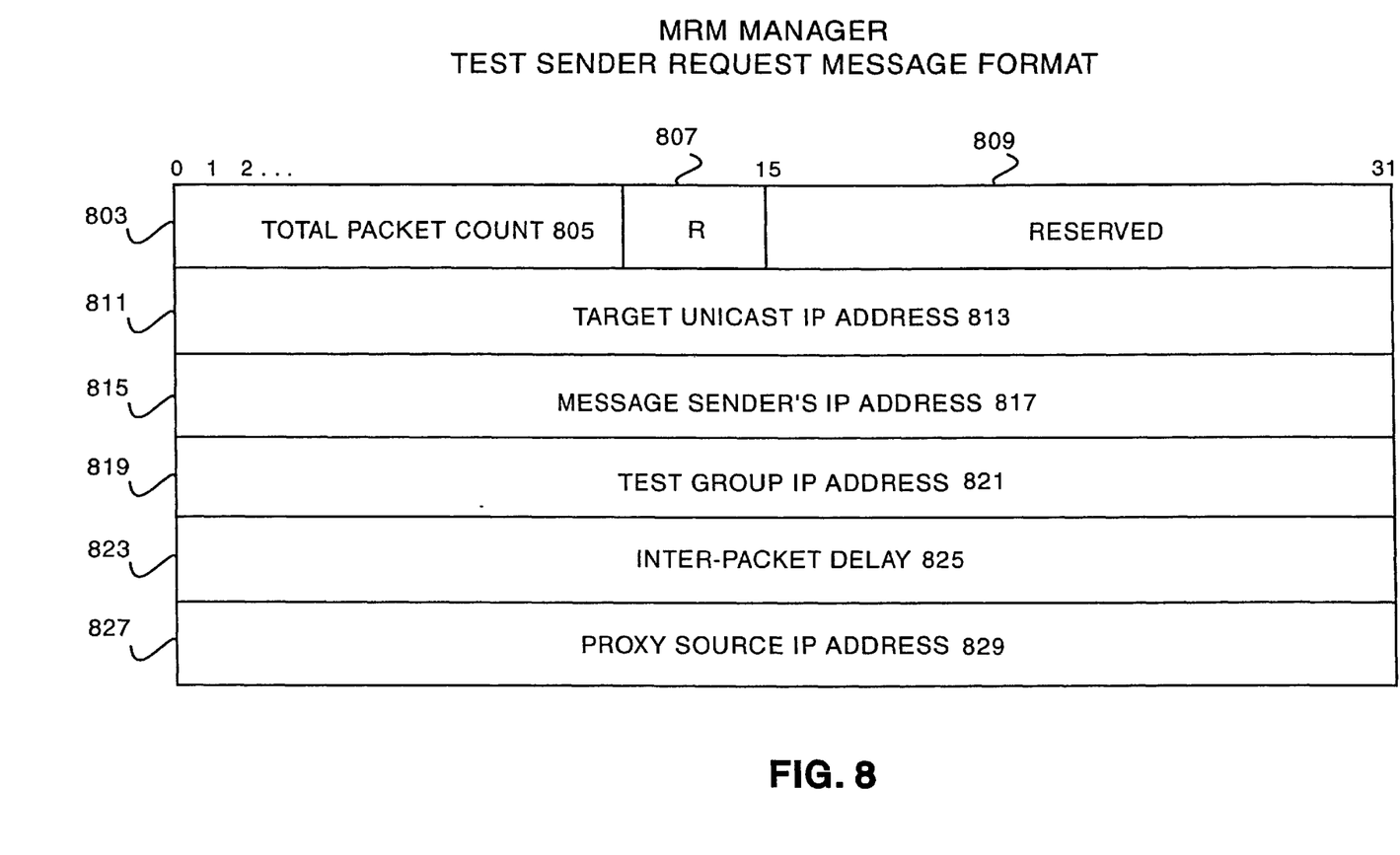
FIG. 8 is a block diagram showing a format of a test sender request message from an MRM manager to a network device in accordance with a preferred embodiment of the present invention.

FIG. 8 is a block diagram showing a format of a test sender request message from an MRM manager to a network device in accordance with a preferred embodiment of the present invention. A test sender request message has one of two code values not conveyed in the message format. A code value of zero indicates a request that the network device act as a local packet trigger and a code value of one indicates a request that the device act as a proxy packet trigger. A test sender request is sent by the MRM manager using a unicast protocol to a test source. The request is later refreshed by sending the same request message using multicast delivery by an MRM beacon message. The codes indicate how test packets are generated. If a test sender is a local packet trigger, the test packets will have the test sender's IP address. The test sender sends periodic test packets at intervals specified in the MRM request message, discussed below. Sequence number 707 shown in field 709 of FIG. 7 is used as an identifier for all test packets originated by the test sender under a particular request. If there are multiple MRM managers in the network, each MRM manager listens to beacon messages emitted by other MRM managers and thereby avoid using the same MRM manager request sequence numbers. Not shown in the test sender request message format is an indication of what format the test packets should be in, such as RTP/UDP or UDP-encapsulated data packets. UDP refers to the Uniform Data Program Protocol and is used for non-guaranteed transmission of data packets. It is a standard protocol well known in the art.

A proxy packet trigger allows a test sender to send MRM test packets using an IP source address provided by the MRM manager (e.g., an IP address of a device outside the given domain for monitoring inter-domain connectivity). This type of request contains all the parameters of a local packet trigger plus a proxy source address. Because of security issues, a proxy packet trigger should be enabled carefully.

A test sender request is in an MRM message and follows message header 509. A field 803 contains a total packet count 805 indicating a total number of packets to be sent by the test sender. In a preferred embodiment, the length of field 803 is 15-bits. A 1-bit field 807 indicates whether the test sender should transmit RTP/UDP encapsulated test packets or UDP encapsulated test packets. A field 809 is a 16-bit reserved field set to all zeros when the request message is transmitted, and is ignored when received, but can be used as needed in future implementations. A field 811 in the sender request message contains a 32-bit target unicast IP address 813. This is the IP address of the device receiving the request message (i.e., the "target" device). It is first transmitted using a unicast communication protocol since it is being sent from a single device to another single device. Subsequently, it is "piggybacked" on an MRM beacon message wich is multicast transmitted to all testers. A field 815 is also a 32-bit field that contains an IP address 817 of the MRM manager. All IP addresses are 32-bits long, the length of one word. Another 32-bit field 819 contains the IP address of the test group. This address is a multicast group IP address. A field 823 contains an interpacket delay 825 indicating the time between consecutive test packets emitted by the test sender. In a preferred embodiment, the time delay is measured in milliseconds. A field 827 is used when the test sender is a proxy packet trigger as discussed above. Proxy source IP address 829 contained in field 827 contains the IP address of a source other than the actual test sender's IP address.

Figure 9:
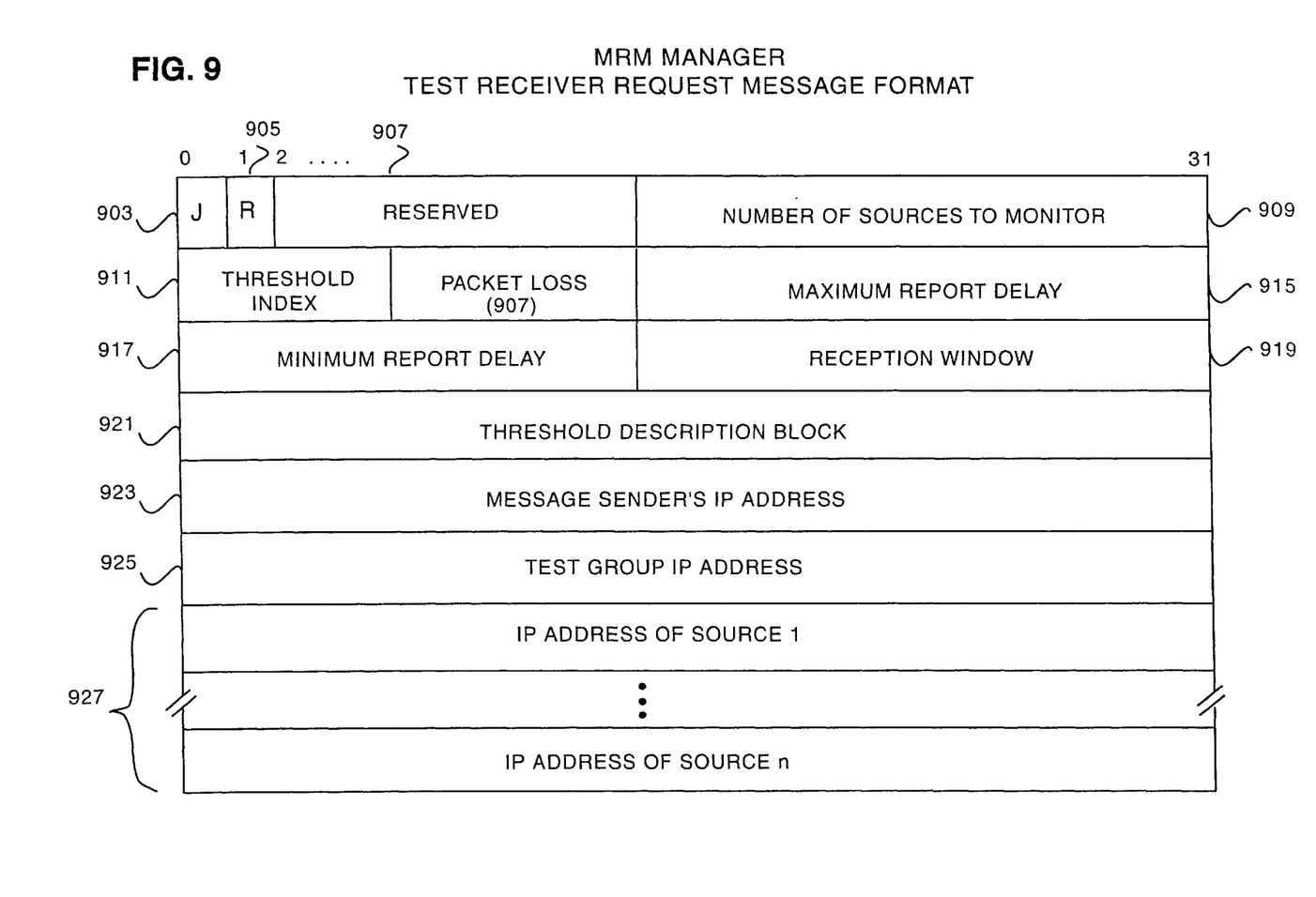
FIG. 9 is a block diagram showing a format of a test receiver request message sent by an MRM manager in accordance with a preferred embodiment of the present invention.

FIG. 9 is a block diagram showing a format of a test receiver request message sent by an MRM manager in accordance with a preferred embodiment of the present invention. A test receiver request message can have one of three code values not included in the message format. A code value of "0" indicates that the message requests that the test receiver device be part of a multicast group. A code value of "1" requests that the test device collect statistics about the test group. A code value of "2" requests that the test device to take actions to isolate the fault.

A 1-bit field 903 in the test receiver request message indicates whether the test device should join the multicast group to be monitored or not join the group. In a preferred embodiment, if the value J is one, the test device should join the multicast group to be monitored. A field 905 is also a 1-bit field that indicates whether fault report sent by the test receiver to the MRM manager should be in RTCP format or whether it should be in a native or MRM specific format. In a preferred embodiment, if the value of R is one, an RTCP report should be sent to the MRM manager. Field 907, similar to field 809 of FIG. 8, is a reserved 14-bit field that can store information as needed in future implementations. Field 909 (the last in the first word of the receiver request message) indicates the number of sources to be monitored. This 16-bit field contains a total number of sources the target tester will monitor. A field 911 contains a threshold index indicating criteria for determining when there is a fault in a device. The value of this index determines the content of a threshold description field described below.

In a preferred embodiment, field 913 contains a percentage indicating a percentage of packets lost. This is used as a criteria to determine whether a fault has occurred. Field 915 is a 16-bit field that contains the maximum time allowed before a fault report must be sent to an MRM manager. It contains the maximum number of seconds within which a fault report must be sent to the MRM manager after a fault is detected. A field 917 is similar to field 915 in that it contains the minimum number of seconds within which a fault report should be sent to the MRM manager after a fault has been detected.

A field 919 is a 16-bit field containing a reception window measured in seconds. The number of seconds in this window is used in calculating packet loss percentage, which is based on a time interval, as indicated in field 913. Field 921 is a variable-length threshold description block. The length of this field depends on the contents of field 911 containing a threshold index. If the threshold index is zero, threshold description block is NULL. If there is a value other than zero in the threshold index, the threshold description block contains additional parameters defining the threshold. A field 922 contains a target unicast IP address. A field 923 contains an IP address of the MRM manager or functionally similar device. As with other IP address fields in the present invention, the length of this field is 32-bits. Field 925 is also a group IP address which contains the IP address of the test group as described above. Field 927 contains IP addresses of the source devices from which the test receiver receives its test packets. If only one test sender is sending packets to the test receiver, then only the first field within fields 927 contains an address. In a preferred embodiment, if the IP address in the first field among fields 927 is "0.0.0.0" the test receiver will receive test packets from all sender devices.

Figure 10:
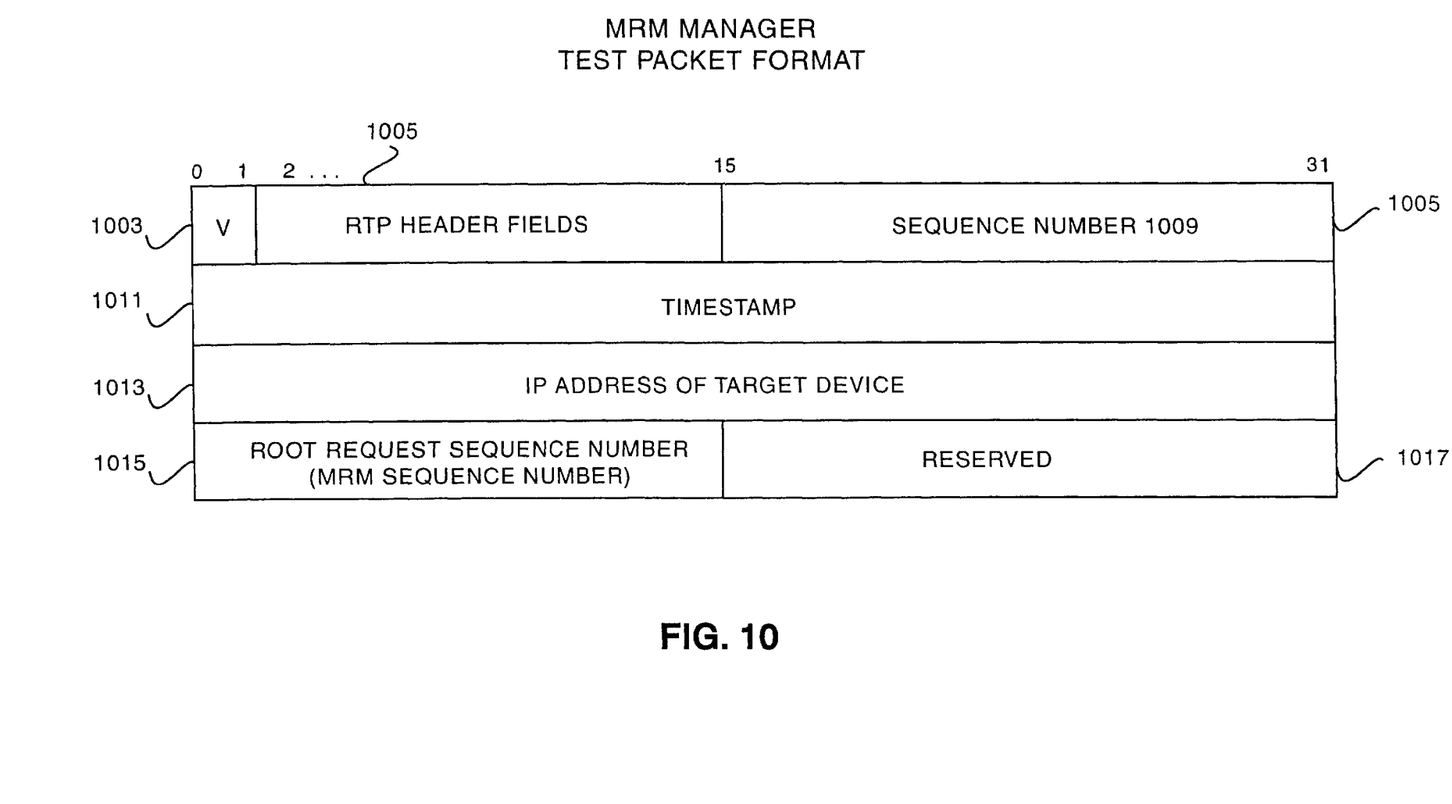
FIG. 10 is a block diagram of a format of a test packet sent by a test source in accordance with a preferred embodiment of the present invention.

FIG. 10 is a block diagram of a format of a test packet sent by a test source in accordance with a preferred embodiment of the present invention. In a preferred embodiment, MRM test packets are RTP/UDP encapsulated. A 1-bit field 1003 in the test packet header contains a version of RTP used to encapsulate the test packet. Similar to field 705 of FIG. 7 is a field 1005 containing standard RTP header fields. Field 1007 is a 16-bit field that contains a sequence number 1009 and is set to zero when the test is activated. This sequence number 1009 is different from other sequence numbers, such as number 707 in FIG. 7. Sequence number 1009 is used by the MRM system to keep track of test packets sent by a test sender in response to a particular test sender request. The next word in the test packet format is a 32-bit field containing a system time stamp measured in milliseconds in a preferred embodiment. The next word in the test packet format is also a 32-bit field 1013 that contains an IP address of the test receiver, i.e., the device receiving the test packet. In other preferred embodiments the number can also be a configured 32-bit number that uniquely identifies the test receiver. In the described embodiment, this field is referred to as the synchronization source identifier. Following field 1013 is a field 1015. This 16-bit field contains a root request sequence number. It contains sequence number 625 associated with a test sender request (from the MRM manager) that started the test. A field 1017 is a 16-bit reserved field for holding information as may be required in future implementations.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should be remembered, however, that all of these and similar terms are to be associated with the appropriate physical quantities and are merely convenient labels applied to these quantities.

The present invention also relates to a device, such as MRM Manager terminal 203, system or apparatus for performing the aforementioned operations. The system may be specially constructed for the required purposes (e.g. a network manager terminal), or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 11:
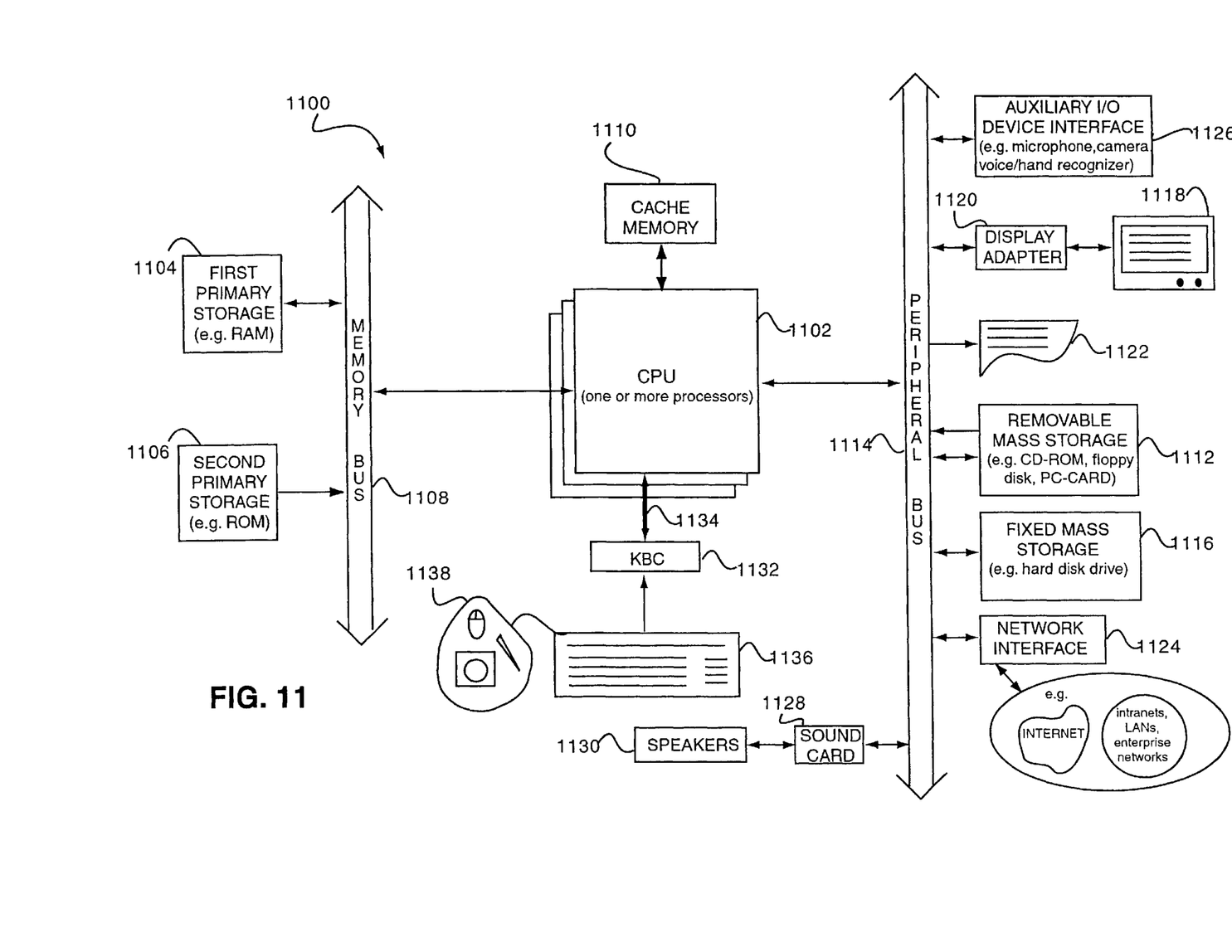
FIG. 11 is a block diagram of a general purpose computer system suitable for carrying out the processing in accordance with one embodiment of the present invention.

FIG. 11 is a block diagram of a general purpose computer system 1100 suitable for carrying out the processing in accordance with one embodiment of the present invention. FIG. 11 illustrates one embodiment of a general purpose computer system. Other computer system architectures and configurations can be used for carrying out the processing of the present invention. Computer system 1100, made up of various subsystems described below, includes at least one microprocessor subsystem (also referred to as a central processing unit, or CPU) 1102. That is, CPU 1102 can be implemented by a single-chip processor or by multiple processors. CPU 1102 is a general purpose digital processor which controls the operation of the computer system 1100. Using instructions retrieved from memory, the CPU 1102 controls the reception and manipulation of input data, and the output and display of data on output devices.

CPU 1102 is coupled bi-directionally with a first primary storage 1104, typically a random access memory (RAM), and uni-directionally with a second primary storage area 1106, typically a read-only memory (ROM), via a memory bus 1108. As is well known in the art, primary storage 1104 can be used as a general storage area and as scratch-pad memory, and can also be used to store input data and processed data. It can also store programming instructions and data, in the form of programming instructions for configuring the test devices as shown in FIGS. 1 and 2 in addition to other data and instructions for processes operating on CPU 1102, and is used typically used for fast transfer of data and instructions in a bi-directional manner over the memory bus 1108. Also as well known in the art, primary storage 1106 typically includes basic operating instructions, program code, data and objects used by the CPU 1102 to perform its functions. Primary storage devices 1104 and 1106 may include any suitable computer-readable storage media, described below, depending on whether, for example, data access needs to be bi-directional or uni-directional. CPU 1102 can also directly and very rapidly retrieve and store frequently needed data in a cache memory 1110.

A removable mass storage device 1112 provides additional data storage capacity for the computer system 1100, and is coupled either bi-directionally or uni-directionally to CPU 1102 via a peripheral bus 1114. For example, a specific removable mass storage device commonly known as a CD-ROM typically passes data uni-directionally to the CPU 1102, whereas a floppy disk can pass data bi-directionally to the CPU 1102. Storage 1112 may also include computer-readable media such as magnetic tape, flash memory, signals embodied on a carrier wave, PC-CARDS, portable mass storage devices, holographic storage devices, and other storage devices. A fixed mass storage 1116 also provides additional data storage capacity and is coupled bi-directionally to CPU 1102 via peripheral bus 1114. The most common example of mass storage 1116 is a hard disk drive. Generally, access to these media is slower than access to primary storage 1104 and 1106. Mass storage 1112 and 1116 generally store additional programming instructions, data, and the like that typically are not in active use by the CPU 1102. It will be appreciated that the information retained within mass storage 1112 and 1116 may be incorporated, if needed, in standard fashion as part of primary storage 1104 (e.g. RAM) as virtual memory.

In addition to providing CPU 1102 access to storage subsystems, the peripheral bus 1114 is used to provide access other subsystems and devices as well. In the described embodiment, these include a display monitor 1118 and adapter 1120, a printer device 1122, a network interface 1124, an auxiliary input/output device interface 1126, a sound card 1128 and speakers 1130, and other subsystems as needed.

The network interface 1124 allows CPU 1102 to be coupled to another computer, computer network, or telecommunications network using a network connection as shown. Through the network interface 124, it is contemplated that the CPU 102 might receive information, e.g., fault reports, from another network, or might output information to another network via edge or transit routers in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 1102 can be used to connect the computer system 1100 to an external network and transfer data according to standard protocols, such as RTP, UDP, or TCP/IP. That is, method embodiments of the present invention may execute solely upon CPU 1102, or may be performed across a network such as the Internet, intranet networks, or local area networks, on devices such as routers and switches, in conjunction with a remote CPU that shares a portion of the processing. Additional mass storage devices (not shown) may also be connected to CPU 1102 through network interface 1124.

Auxiliary I/O device interface 1126 represents general and customized interfaces that allow the CPU 1102 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 1102 is a keyboard controller 1132 via a local bus 1134 for receiving input from a keyboard 1136 or a pointer device 1138, and sending decoded symbols from the keyboard 1136 or pointer device 1138 to the CPU 1102. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 1108, peripheral bus 1114, and local bus 1134 are illustrative of any interconnection scheme serving to link the subsystems. For example, a local bus could be used to connect the CPU to fixed mass storage 1116 and display adapter 1120. The computer system shown in FIG. 11 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. In a test monitoring device, a method of detecting a fault in a multicast routing infrastructure, the method comprising:

sending a source configuration request for configuring a device in the infrastructure to be a test packet source, the source configuration request containing an identifier identifying the test monitoring device;

sending a receiver configuration request for configuring one or more devices in the infrastructure to be test packet receivers where the test packet source sends out test packets to a predetermined group of test packet receivers, the predetermined group having a group identifier; and examining data reports from the test packet receivers relating to a plurality of test packets sent by the test packet source where the data reports are examined shortly after the data reports are provided by the test packet receivers.

2. In a test monitoring device, the method as recited in claim 1 further comprising:

configuring the test monitoring device in the multicast routing infrastructure to initiate a desired test.

3. In a test monitoring device, the method as recited in claim 2 further comprising:

sending the data reports to the test monitoring device in a time-dependent manner to avoid overloading the infrastructure with data reports.

4. In a test monitoring device, the method as recited in claim 3 wherein sending the data reports to the test monitoring device in a time-dependent manner further comprises:

instructing each test packet receiver to transmit data reports to the monitoring device at a preset time interval thereby staggering the transmission and receipt of data reports.

5. In a test monitoring device, the method as recited in claim 2 further comprising sending a beacon message to the test packet source and to the one or more test packet receivers to inform the test packet source and the one or more test packet receivers that the monitoring device is active.

6. In a test monitoring device, the method as recited in claim 1 further comprising monitoring reception conditions at the test packet receivers.

7. In a test monitoring device, the method as recited in claim 1 wherein the receiver configuration request sent to a test packet receiver includes a test group identifier indicating that the test packet receiver belongs to a particular test group.

8. In a test monitoring device, the method as recited in claim 1 wherein the source configuration request includes a unique identifier used to identify the source configuration request and associate test packets emitted by the test packet source that receives the source configuration request.

9. In a test monitoring device, the method as recited in claim 8 wherein the unique identifier is a monotonically increasing sequence number.

10. In a test monitoring device, the method as recited in claim 1 wherein a test packet receiver receives test packets from more than one test packet source.

11. In a test monitoring device, the method as recited in claim 1 further comprising:

determining whether a predetermined number of test packets sent by the test packet source to a test packet receiver was affected while in transit thereby indicating a fault in the multicast routing infrastructure; and creating a data report in response to the fault.

12. A system for detecting faults in a multicast routing infrastructure having a plurality of data routing devices, the system comprising:

a test monitoring device for propagating test information including test source request packets and test receiver request packets and for collecting fault data;

a test packet source device configured to transmit test packets using a multicast protocol; and a plurality of test packet receiving devices configured to receive test packets from the test packet source device and to transmit fault data to the test monitoring device; wherein the test source request packets and the test receiver request packets contain an identifier corresponding to the test monitoring device.

13. A system as recited in claim 12 wherein the test receiver request packets and the test source request packets contain a test group identifier for identifying a group of test packet receiving devices.

14. A system as recited in claim 13 wherein the test group identifier is an Internet Protocol address.

15. A system as recited in claim 12 wherein a test receiver request packet contains data relating to time intervals in which a test packet receiving device transmits fault data to the test monitoring device.

16. A system as recited in claim 12 wherein a test receiver request packet contains criteria on when a fault in the multicast routing infrastructure has occurred.

17. A system as recited in claim 12 wherein the test monitoring device further comprises a fault isolation mechanism enabling the test monitoring device to isolate a faulty device in the multicast routing infrastructure.

18. A computer program product for detecting a fault in a multicast routing infrastructure using a test monitoring device, the computer program product comprising:

a computer readable medium;

a computer code stored on the computer readable medium for sending a source configuration request for configuring a device in the infrastructure to be a test packet source, the source configuration request containing an identifier identifying the test monitoring device;

a computer code stored on the computer readable medium for sending a receiver configuration request for configuring one or more devices in the infrastructure to be test packet receivers where the test packet source sends out test packets to a predetermined group of test packet receivers, the predetermined group having a group identifier; and a computer code stored on the computer readable medium for examining data reports from the test packet receivers relating to a plurality of test packets sent by the test packet source where the data reports are examined shortly after the data reports are provided by the test packet receivers.

* * * * *